United States Patent
Kijima et al.

(10) Patent No.: US 8,677,869 B2
(45) Date of Patent: Mar. 25, 2014

(54) TAILSTOCK DEVICE

(75) Inventors: Tetsuya Kijima, Aichi Prefecture (JP);
Yutaka Wakikaido, Aichi Prefecture (JP); Hisao Goto, Aichi Prefecture (JP);
Mikio Wakida, Aichi Prefecture (JP)

(73) Assignee: Yamazaki Mazak Corporation,
Niwa-gun, Aichi Pref. (JP)

( * ) Notice: Subject to any disclaimer, the term of this patent is extended or adjusted under 35 U.S.C. 154(b) by 376 days.

(21) Appl. No.: 13/260,098

(22) PCT Filed: Jan. 28, 2010

(86) PCT No.: PCT/JP2010/051139
§ 371 (c)(1),
(2), (4) Date: Sep. 23, 2011

(87) PCT Pub. No.: WO2011/092820
PCT Pub. Date: Aug. 4, 2011

(65) Prior Publication Data
US 2012/0011972 A1    Jan. 19, 2012

(51) Int. Cl.
*B23B 23/00* (2006.01)
(52) U.S. Cl.
USPC ................................. 82/148; 82/118
(58) Field of Classification Search
USPC .................................. 82/148, 118
See application file for complete search history.

(56) References Cited

U.S. PATENT DOCUMENTS 5,575,041 A * 11/1996 Lee ................................ 82/148
8,156,850 B2 * 4/2012 Ichikawa et al. .............. 82/148

FOREIGN PATENT DOCUMENTS

| JP | 06-055310 | 3/1994 |
| JP | 2005-199404 | 7/2005 |
| JP | 2006-315141 | 11/2006 |
| JP | 2006-346754 | 12/2006 |
| JP | 2007061971 A * | 3/2007 |
| JP | 2008-302436 | 12/2008 |
| JP | 2009184087 A * | 8/2009 |

* cited by examiner

*Primary Examiner* — Daniel Howell
*Assistant Examiner* — Nicole N Ramos
(74) *Attorney, Agent, or Firm* — Marsh Fischmann & Breyfogle LLP

(57) ABSTRACT

A control panel 21 has a display screen 22. An operator turns a low-thrust pressing key 28 ON in the menu key group 26 displayed on the display screen 22. In this state, the operator turns an operating dial 32 of a manual pulse generator 31, thereby causing an encoder 34 to generate pulses. When the encoder 34 outputs a pulse signal as a command signal, and a servomotor 17 is driven in accordance with the command signal, the tailstock is advanced. With the distal end of a tailstock center contacting a center hole of the workpiece, the operator turns the operating dial 32, thereby finely adjusting the drive torque of the servomotor. Accordingly, the thrust of the tailstock center is finely adjusted, so that the tailstock center is pressed against the workpiece by a low thrust.

3 Claims, 4 Drawing Sheets

TAILSTOCK DEVICE

FIELD OF THE INVENTION

The present invention relates to a tailstock device that supports a workpiece supported by a headstock of a machine tool by pressing the tailstock center of a tailstock against the workpiece, and particularly to a tailstock device capable of supporting a workpiece with a low tailstock thrust.

BACKGROUND OF THE INVENTION

A machine tool that performs turning includes a headstock having a chuck. The chuck can clamp an end of a workpiece such as a camshaft. A machine tool also includes a tailstock that is arranged to face the headstock. The tailstock can reciprocate and is pressed against a center hole in the free end of a workpiece. The tailstock is reciprocated via a lead screw mechanism. The lead screw mechanism is actuated by a servomotor. The tailstock is advanced by the servomotor via a screw shaft. When the tailstock center of the tailstock is pressed against the center hole of a workpiece, the workpiece is supported by the chuck and the tailstock center with a predetermined tailstock thrust.

Patent Document 1 discloses a method for setting a tailstock thrust of a tailstock center. According to this method, tailstock thrust is set by a tailstock thrust setting section. A torque command converting section converts the set tailstock thrust into drive torque of the servomotor, while taking into consideration the tailstock sliding surface resistance, the frictional torque of the receiving portion of the lead screw, and the efficiency of the screw shaft—these are set by a parameter setting section, and the gear ratio of the drive system. When the tailstock command section is operated, a tailstock controlling section is activated. Then, the torque of the servomotor is controlled through a servomotor controlling section and a power amplifying section, so that the tailstock is driven and controlled. The tailstock controlling section stores the drive torque, which has been obtained through conversion at the torque command converting section, in a torque limit value storing section, and sends a torque limit value to the servomotor controlling section. The servomotor controlling section performs torque limit control of the servomotor by setting a torque limit value (drive torque) as the upper limit. Accordingly, the tailstock thrust of the tailstock center is set.

In the method for setting the tailstock thrust in the above described conventional tailstock device, the torque value of the servomotor (current value) is limited before the tailstock center is pressed against a workpiece. Thereafter, the tailstock center is pressed against the workpiece. Accordingly, the tailstock cannot be operated when the torque limit value is set to a value less than or equal to the resistance such as the sliding surface resistance of the tailstock. Therefore, when a workpiece is made of a material of a low strength, such as a synthetic resin, the thrust of the tailstock center becomes excessive. This can deform the workpiece and lower machining accuracy of the workpiece by a tool.

PRIOR ART DOCUMENTS

Patent Document

Patent Document 1: Japanese Laid-Open Patent Publication No. 2006-346754

SUMMARY OF THE INVENTION

The present invention relates to a tailstock device that is capable of supporting a workpiece with a thrust that is less than or equal to the thrust required for moving a tailstock against resistance such as sliding surface resistance.

To achieve the foregoing objective, in accordance with a first aspect of the present invention, a tailstock device is provided that supports a workpiece by pressing the center of a tailstock against the workpiece. The tailstock is reciprocated by a servomotor via a lead screw mechanism. The tailstock device includes a normal tailstock thrust setting means, a low tailstock thrust setting means, and a display means. The normal tailstock thrust setting means sets, as a torque limit value of the servomotor, a tailstock thrust required for supporting a workpiece. The low tailstock thrust setting means applies a tailstock thrust lower than the normal tailstock thrust to the tailstock center through manual operation. The display means displays the tailstock thrust of the tailstock center applied to the workpiece.

According to this configuration, the manually operated low thrust setting means allows the tailstock center of the tailstock to be pressed against the workpiece with a tailstock thrust that is lower than the normal tailstock thrust, while the tailstock thrust displayed on the screen of the display means is being visually observed. Therefore, the tailstock center can be pressed against the workpiece with a low thrust less than or equal to the thrust required for moving the tailstock, so that a workpiece of a low strength can be properly supported. Therefore, even a workpiece of a low strength can be highly accurately machined.

In the tailstock device described above, the low tailstock thrust setting means preferably includes a low tailstock thrust key and a manual pulse generator. The low tailstock thrust key sets the screen of the display means to a low tailstock thrust pressing mode. The manual pulse generator is manually operated to generate pulses for driving the servomotor. In a state where the tailstock and the tailstock center are stopped with the tailstock center pressed against the workpiece so that the rotational torque of the servomotor is prevented from being influenced by the sliding resistance of the tailstock, the servomotor is rotated based on the error between a feedback signal output from an encoder of the servomotor and a command signal generated by the manual pulse generator, thereby elastically deforming the lead screw mechanism. The elastic resilience of the lead screw mechanism at that time presses the tailstock center against the workpiece with a low tailstock thrust.

The above described tailstock device preferably includes a multiplication factor setting means for changing an amount per pulse of a command signal generated by the manual pulse generator.

The above described tailstock device preferably includes a disabling means. If the thrust of the tailstock center applied to the workpiece exceeds a permissible range in the low tailstock thrust pressing mode, the disabling means disables the operation of the manual pulse generator.

DETAILED DESCRIPTION OF THE PREFERRED EMBODIMENTS

Figure 3:
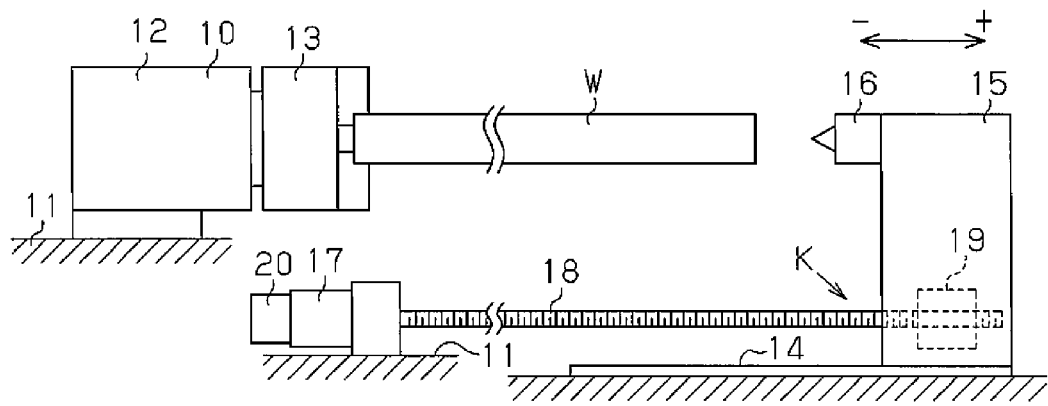
FIG. 3 is a simplified front view of main devices forming a machine tool.

As shown in FIG. 3, a headstock 12 having a motor 10 is fixed to a machine base 11 of a machine tool. A chuck 13 for clamping an end of a workpiece W is attached to the rotary shaft of the motor 10. A guide rail 14 is laid on the machine base 11. A tailstock 15 is reciprocated horizontally along the guide rail 14. A tailstock center 16 is attached to the tailstock 15. The tailstock center 16 is pressed against a center hole (not shown) formed in the free end of the workpiece W. The free end of the workpiece W is thus supported.

A servomotor 17 is arranged on the machine base 11. A screw shaft 18 is coupled to the rotary shaft of the servomotor 17. The distal end of the screw shaft 18 is screwed to an internal thread body 19 attached to the tailstock 15. The screw shaft 18 and the internal thread body 19 form a lead screw mechanism K of the tailstock 15. An encoder 20 is attached to the servomotor 17 to detect the rotation angle of the rotary shaft of the servomotor 17. The encoder 20 outputs, as a feedback signal Pf, a pulse signal proportionate to the rotation angle of the rotary shaft to an error counter 46.

Figure 1:
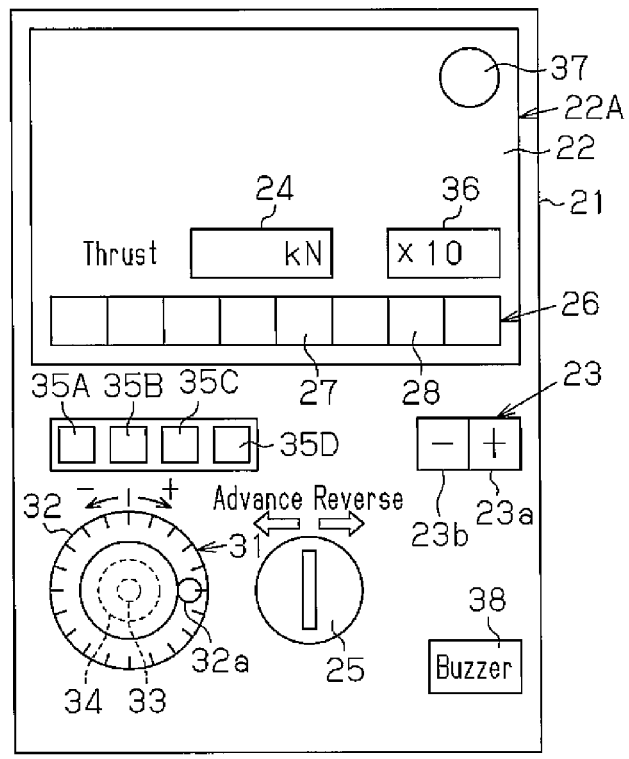
FIG. 1 is a front view of a control panel of a tailstock device according to one embodiment of the present invention.

A control panel 21 is provided on the front face of the machine base 11 shown in FIG. 1. A display portion 22A is provided in an upper section of the control panel 21. The display portion 22A has a touch panel function and includes a display screen 22 serving as a display means. A thrust inputting key 23 is provided in a middle section of the control panel 21. The thrust inputting key 23 is used for setting the thrust given via the tailstock center 16. The display portion 22A includes a thrust displaying portion 24 that displays the value of the thrust of the tailstock center 16 applied to the workpiece W.

An advance/reverse switch 25 is located in a lower section of the control panel 21. In a normal-thrust pressing mode discussed below, when the advance/reverse switch 25 is switched from a neutral position to an advance position, the servomotor 17 as shown in FIG. 3 is rotated so that the tailstock 15 advances toward the workpiece W. When the workpiece W is pressed by the tailstock center 16 and the thrust reaches a normal set value (for example, 1 to 5 kN) set by the thrust inputting key 23, the tailstock 15 is stopped while maintaining the torque output of the servomotor 17. When the advance/reverse switch 25 is switched from the neutral position to the reverse position, the servomotor 17 is rotated in the reverse direction, so that the tailstock 15 retreats away from the workpiece W.

A function menu key group 26 is provided on the display screen 22. The function menu key group 26 includes a normal-thrust pressing key 27 and a low-thrust pressing key 28. When the normal-thrust pressing key 27 is turned ON, the normal-thrust pressing mode is selected, and the display screen 22 is switched from the menu screen to a screen that shows the normal-thrust pressing mode. When the low-thrust pressing key 28 is turned ON, a low-thrust pressing mode is selected, and the display screen 22 is switched to a screen that shows the low-thrust pressing mode shown in FIG. 1.

The control panel 21 has a manual pulse generator 31. The manual pulse generator 31 consists of an operating dial 32 having a knob 32a, and an encoder 34 coupled to the operating dial 32 by a shaft 33. The operating dial 32 is provided on the surface of the control panel 21, and the encoder 34 is provided on the back surface of the control panel 21. When the operating dial 32 is manually rotated, the encoder 34 outputs pulse signals which are proportionate to the rotation angle of the operating dial 32. The pulse signals are output to the error counter 46 as command signals Pc via a CPU 42. The control panel 21 has first to fourth multiplication factor setting keys 35A to 35D functioning as a movement amount adjusting means. The first to fourth multiplication factor setting keys 35A to 35D are used for changing the movement amount per pulse output by the manual pulse generator 31,— one time, ten times, hundred times, and a thousand times the original value. The movement amount per pulse is, for example, 0.0001 mm. The display screen 22 has a multiplication factor display portion 36, which shows the value of the multiplication factor selected by the first to fourth multiplication factor setting keys 35A to 35D. The display screen 22 also has an alarm display portion 37 for displaying an alarm. A buzzer 38 is provided in a lower section of the control panel 21.

A control system for executing various control processes will now be described with reference to FIG. 2.

Figure 2:
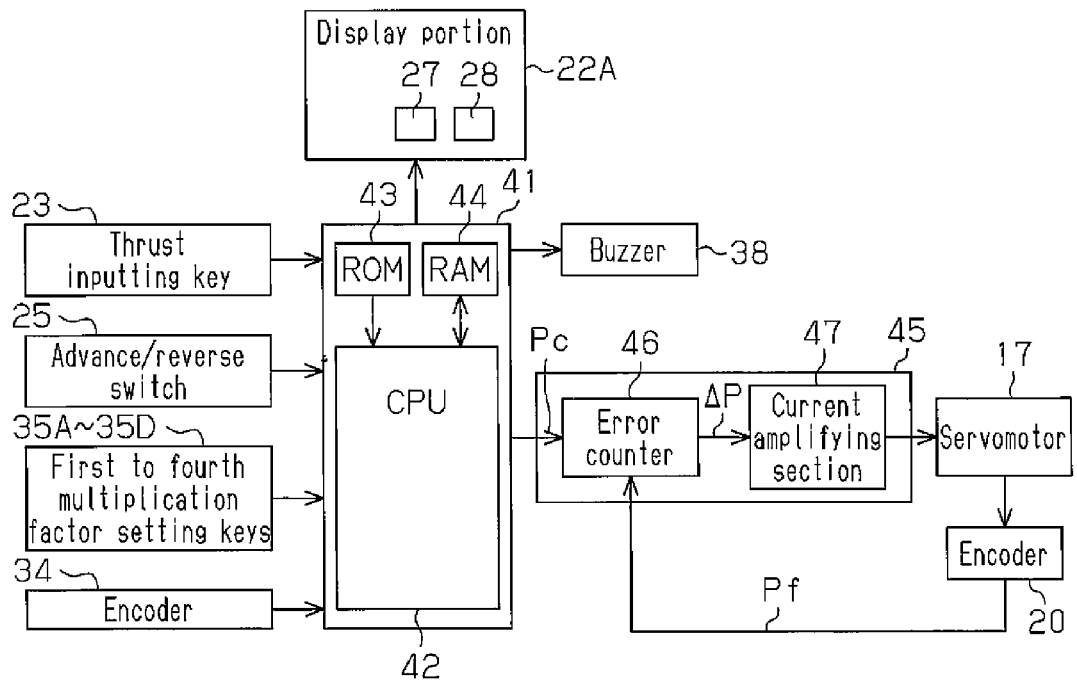
FIG. 2 is a block circuit diagram of a control device.

As shown in FIG. 2, a control device 41 includes a CPU 42 that executes predetermined computation processes based on various types of data. The control device 41 includes a read only memory (ROM) 43 storing control programs for executing various operations, and a random access memory (RAM) 44 for temporarily storing various types of data. The control device 41 is connected to the thrust inputting key 23, the advance/reverse switch 25, the encoder 34, and the first to fourth multiplication factor setting keys 35A to 35D. The control device 41 is also connected to the display portion 22A. The display screen 22 of the display portion 22A displays the normal-thrust pressing key 27 and the low-thrust pressing key 28. The control device 41 is connected to the servomotor 17 via a servomotor amplifier 45 (power amplifying section) and to the buzzer 38.

The control device 41 is also connected to an error counter 46 of the servomotor amplifier 45. The error counter 46 receives the feedback signal Pf, which is a pulse signal output from the encoder 20 of the servomotor 17. The error counter 46 also receives via the CPU 42 the command signal Pc, which is a pulse signal output from the encoder 34 of the manual pulse generator 31. The error counter 46 calculates an error $\Delta P$ between the feedback signal Pf and the command signal Pc ($\Delta P = Pf - Pc$: also referred to as an accumulated pulse). The error $\Delta P$ is amplified at a current amplifying section 47. The servomotor 17 is driven based on the amplified error $\Delta P$.

When the CPU 42 is activated, the control device 41 executes various processes required for controlling the tailstock operation based on various computations executed by the CPU 42, according to computer programs stored in the ROM 43. The CPU 42 stores the computer programs not in the ROM 43 incorporated in the control device 41, but in an external recording device that has a computer readable recording medium. The CPU 42 reads out the computer programs from the external recording device as necessary.

The control device 41, the CPU 42, and the first to fourth multiplication factor setting keys 35A to 35D form a multiplication factor setting means. The thrust inputting key 23, the thrust displaying portion 24, and the normal-thrust pressing key 27 of the control panel 21, and the control device 41 form normal tailstock thrust setting means. Further, the thrust displaying portion 24, the low-thrust pressing key 28, the manual pulse generator 31 of the control panel 21, the control device 41, and the servomotor amplifier 45 having the error counter 46 form a low tailstock thrust setting means.

Figure 4:
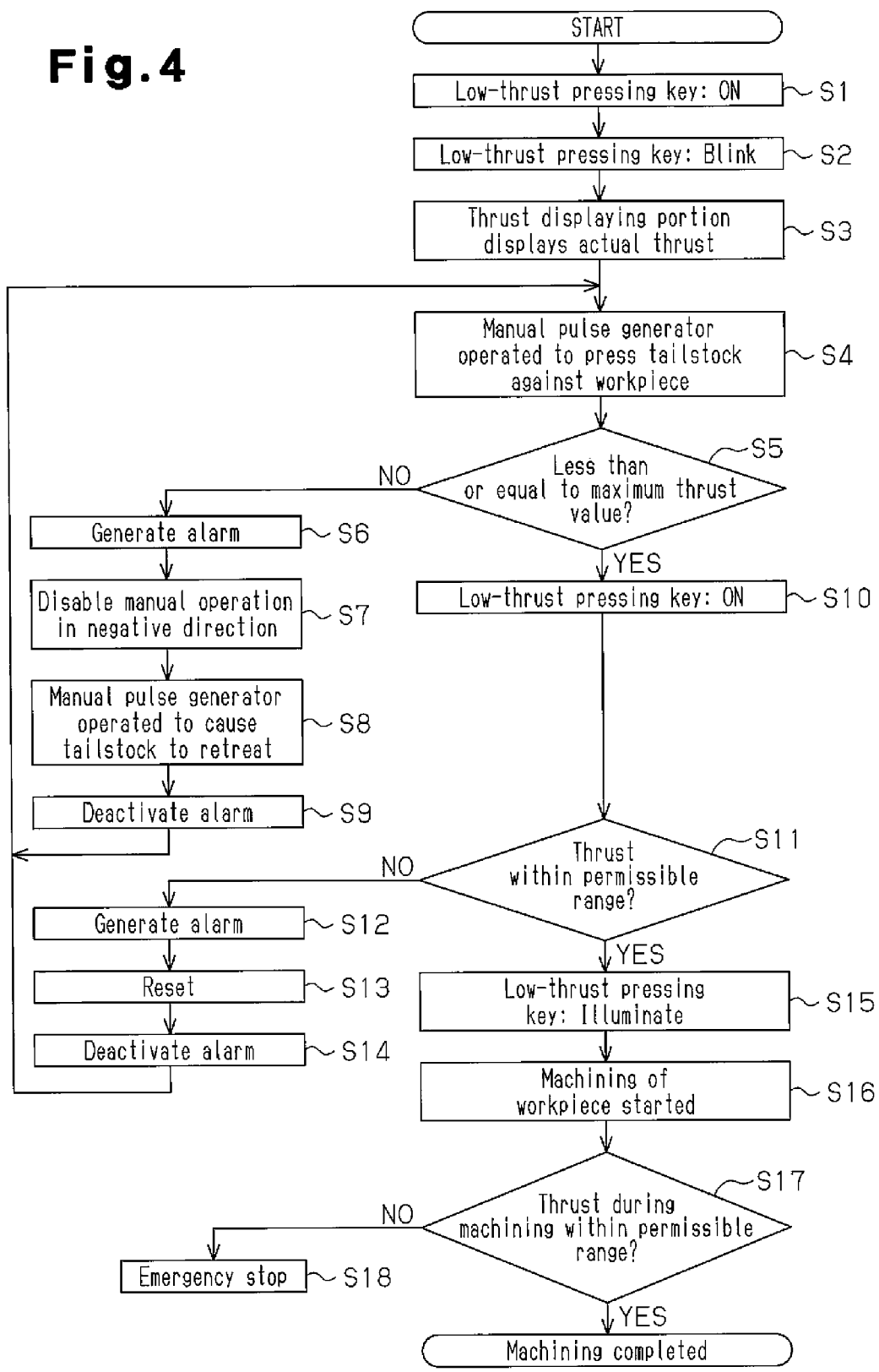
FIG. 4 is a explanatory flowchart of an operation for adjusting low thrust of the tailstock.

Operation of the above described tailstock device will now be described with reference mainly to the flowchart of FIG. 4. A tailstock operation for the workpiece W by the tailstock center 16 is executed by operating keys and switches on the control panel 21 with an end of the workpiece W clamped by the chuck 13.

In the case of a workpiece W made of a normal high-strength material such as a metal rod, a required thrust, for example, a value between 1 kN to 5 kN, is input by the thrust inputting key 23 in normal mode, and stored in a predetermined area of the RAM 44. In this state, if the advance/reverse switch 25 is switched to the advance position, the tailstock 15, which has the tailstock center 16, is moved toward the workpiece W. Then, the workpiece W is held between the chuck 13 and the tailstock center 16 by the set normal thrust (1 to 5 kN). The normal thrust of the tailstock center 16 is set by executing the torque limit control for the servomotor 17 as described in the Background Art section.

Being held by normal thrust, the workpiece W can be machined. After the machining is completed, when the advance/reverse switch 25 is switched in the opposite direction, that is, to the reverse position, the tailstock 15 retreats so that the tailstock center 16 separated away from the workpiece W.

A workpiece W of a low strength, such as a synthetic resin, is machined in the following manner. Steps S1 to S18 represent pressing action and related actions of the tailstock center 16 by a low thrust corresponding to a low-strength workpiece W. Hereinafter, steps S1 to S18 will be simply referred to as S1 to S18.

FIG. 3 shows a state where the tailstock center 16 is separated from the workpiece W. In this state, at S1 in FIG. 4, the low-thrust pressing key 28 shown in FIG. 1 is turned ON. At S2, the display screen 22 is switched to the low thrust mode screen, that is, the low-thrust pressing key 28 is changed from non-illuminating state to a blinking state. At S3, the reading of the thrust displaying portion 24 is switched from the set value under the normal mode (normal thrust: for example, 1 to 5 kN) to the actual thrust under the low thrust mode (0.0 kN in the initial state). The background of the thrust reading is colored so as to be easily noticed by an operator.

At S4, the operator manually turns the operating dial 32 in the direction of minus (−), and the encoder 34 sends to the control device 41 pulses which correspond to the rotation angle of the operating dial 32. A value obtained by multiplying the number of these pulses by the multiplication factor set by any of the first to fourth multiplication factor setting keys 35A to 35D is sent as a command value Pc to the error counter 46. The servomotor 17 is rotated in accordance with the command signal Pc received by the error counter 46.

When the command signal Pc is sent to the error counter 46 from the encoder 34 via the CPU 42 in this manner, the error counter 46 calculates the error ΔP (accumulated pulse) between the command signal Pc and the feedback signal Pf from the encoder 20. When the error ΔP is input to the current amplifying section 47, the servomotor 17 is rotated according to the drive current that is output by the current amplifying section 47 and calculated based on the error ΔP. As the servomotor 17 rotates, the tailstock 15 advances toward the workpiece W.

By manually rotating the operating dial 32, the tailstock center 16 is advanced from a retreat position to a position immediately before contacting the workpiece W. The operator can adjust the movement amount of the tailstock center 16 per pulse by properly selecting one of the first to fourth multiplication factor setting keys 35A to 35D in advance. Therefore, by changing the multiplication factor in accordance with the distance between the workpiece W and the tailstock center 16, the tailstock center 16 can be quickly and safely brought into contact with the workpiece W without erroneously causing the tailstock center 16 to collide with the workpiece W. That is, while the distance to the workpiece W is great, the tailstock center 16 can be moved quickly by using a greater multiplication factor. As the distance to the workpiece W decreases, the tailstock center 16 can be moved more slowly by using a smaller multiplication factor.

When the distal end of the tailstock center 16 is pressed against the workpiece W, and the advancement of the tailstock 15 and the tailstock center 16 is stopped, the operator temporarily stops manual turning of the manual pulse generator 31. Accordingly, rotation of the servomotor 17 is stopped, and the feedback signal Pf from the encoder 20 becomes zero. In this state, when the operating dial 32 starts being manually turned again, the encoder 34 outputs pulses as a command signal Pc, so that the error ΔP between the feedback signal Pf and the command signal Pc is calculated. Then, a drive current in accordance with the error ΔP is supplied to the servomotor 17 from the current amplifying section 47. Since the servomotor 17 is slightly turned with the tailstock 15 and the tailstock center 16 stopped, the screw shaft 18 and the internal thread body 19 of the lead screw mechanism K are elastically deformed (deflected). The elastic resilience of the lead screw mechanism K causes the tailstock center 16 to be pressed against the workpiece W by a low thrust.

In a state where the tailstock 15 and the tailstock center 16 are stopped, the rotation torque of the servomotor 17 is not influenced by the sliding resistance of the tailstock 15. The rotation torque of the servomotor 17 therefore does not need to be set greater than necessary. It is thus possible to set the tailstock thrust of the tailstock center 16 to a low thrust.

As described above, the tailstock center 16 is pressed against the workpiece W by a thrust produced by the resilience based on the elastic deformation of the lead screw mechanism K. The value of the thrust at this time is displayed on the thrust displaying portion 24. The operator stops manually turning the operating dial 32 when the value displayed on the thrust displaying portion 24 becomes a target value (for example, 0.8 kN). When the manual turning of the operating dial 32 is stopped, the encoder 34 stops producing command signals Pc. Therefore, the rotation of the servomotor 17 is controlled by the servomotor amplifier such that the error ΔP between the feedback signal Pf and the signal Pc becomes zero. This state is referred to as a "servo-lock state". At this time, the servomotor 17 keeps receiving a predetermined drive current in order to maintain the error ΔP at zero even if the elastic resilience of the lead screw mechanism K acts on the servomotor 17, that is, in order to maintain the rotation angle position of the servomotor 17. As a result, a predetermined torque is applied to the screw shaft 18 of the lead screw mechanism K, and the elastic resilience of the lead screw mechanism K applies a predetermined thrust to the tailstock center 16.

Figure 5:
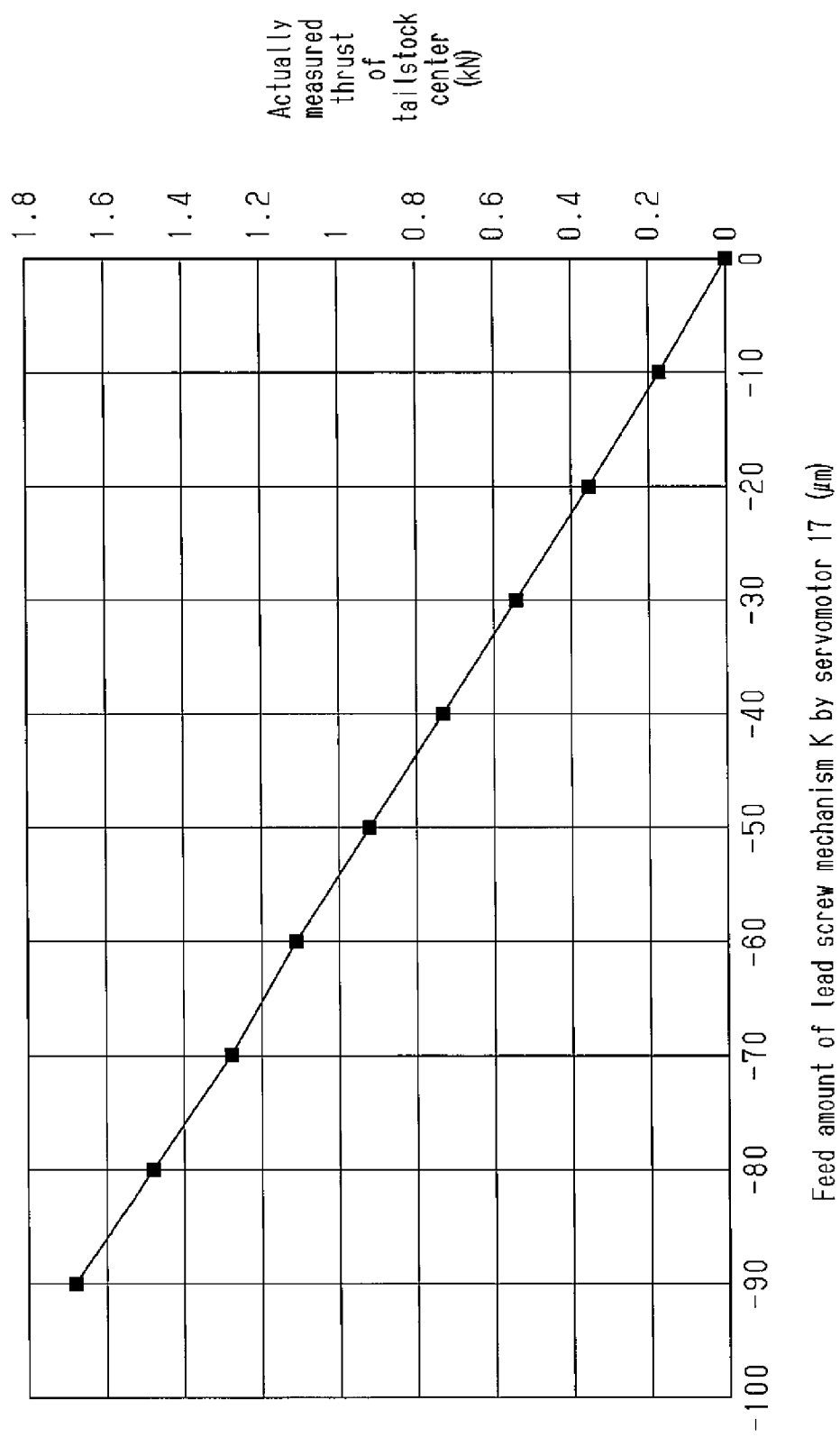
FIG. 5 is a graph showing the relationship between the feed amount of the lead screw mechanism by the manual pulse generator and the actually measured tailstock thrust of the tailstock center.

As shown in FIG. 5, it was revealed that when the rotation amount of the servomotor 17 by the command signal Pc from the encoder 34 based on manipulation of the manual pulse generator 31, that is, the commanded feed amount (μm) of the lead screw mechanism K was increased in the negative direction, the actual measured thrust of the tailstock center 16 increased substantially in direct proportion to the increase of the feed amount. The thrust of the tailstock center 16 was measured several times, and substantially the same result was obtained each time.

At S5, the CPU 42 determines whether an actual thrust Fx is less than or equal to a predetermined maximum thrust value Fmax (for example, 10 kN). For example, if the tailstock center 16 contacts a part of the machine base 11 for some reason, the servomotor 17 or a transmission system can receive an excessive load. If the actual thrust Fx exceeds the maximum thrust value Fmax, the CPU 42 displays an alarm on the alarm display portion 37 and activates the buzzer 38 at S6. This notifies the operator of an abnormality in the tailstock center 16. At S7, the CPU 42 functions as a disabling means and disables pulses generated by manual turning of the operating dial 32 in the negative direction. Next, at S8, the operator manipulates the operating dial 32 in the positive direction, so that the tailstock 15 is moved away from the workpiece W. Accordingly, the actual thrust Fx is reduced. When the actual thrust Fx becomes less than or equal to the maximum thrust Fmax, the CPU 42 deactivates the alarm (including the buzzer) at S9 and returns to S4. In this manner, the operator can dissolve the abnormality in the tailstock center 16 by manually turning the operating dial 32 in the positive direction to cause the tailstock 15 to retreat.

In contrast, in a case where the actual thrust Fx is less than or equal to the maximum thrust value Fmax, if the operator turns ON the low-thrust pressing key 28 again at S10, and at S11 the CPU 42 determines whether the actual thrust Fx is within a permissible range (for example, between 0.5 kN and 1.0 kN, inclusive). If the actual thrust Fx is outside the permissible range, the CPU 42 displays an alarm on the alarm display portion 37 at S12. When the operator resets the flag representing the alarm at S13, the CPU 42 deactivates the alarm (including the buzzer) at S14, and returns to S4. In this example, since the actual thrust Fx is outside the permissible range, the alarm is activated to notify the operator of the condition. However, since the condition is not a dangerous one, the CPU 42 does not disable pulses generated by manual turning of the operating dial 32.

If the actual thrust Fx is within the permissible range at S11, the CPU 42 changes the low-thrust pressing key 28 from the blinking state to the illuminated state at S15. At the same time, the CPU 42 disables adjustment of the thrust by manual turning of the operating dial 32. As a result, the actual thrust Fx of the tailstock center 16 is set to the target thrust. Next, machining of the workpiece W is started at S16. At S17, the CPU 42 determines whether an abnormally excessive thrust is not acting on the workpiece W being machined, that is, whether the actual thrust Fx is within a permissible range (for example, ±0.2 kN). As long as the actual thrust Fx is within the permissible range, the CPU 42 determines that the machining is being performed normally, and allows the machining of the workpiece W to be completed. If the actual thrust Fx is outside the permissible range, the CPU 42 causes the control device 41 to output an emergency stop signal to the servomotor 17 at S18, thereby stopping the operation for machining the workpiece W.

The present embodiment has the following advantages.

(1) The function menu key group 26 is displayed on the display screen 22 of the control panel 21. The operator switches the display screen 22 to the low-thrust pressing mode by turning the low-thrust pressing key 28 ON in the menu key group 26. The control panel 21 has the manual pulse generator 31, which includes the operating dial 32. When the operator manually turns the operating dial 32, the encoder 34 generates pulses for driving the servomotor 17. The error counter 46 calculates the error ΔP between the feedback signal Pf from the encoder 20 of the servomotor 17 and the command signal Pc from the encoder 34 of the manual pulse generator 31. Further, the workpiece W is pressed by the tailstock center 16, and the tailstock 15 and the tailstock center 16 are stopped at predetermined positions, so that the rotation torque of the servomotor 17 is not influenced by the sliding resistance of the tailstock 15. In this state, the operating dial 32 is manually turned so that the encoder 34 outputs the command signal Pc. This allows the error counter 46 to calculate the error ΔP between the feedback signal Pf and the command signal Pc. The servomotor 17 is slightly rotated based on the error ΔP to elastically deform the lead screw mechanism K. The elastic resilience of the lead screw mechanism K generated at this time presses the tailstock center 16 against the workpiece W. Therefore, after the tailstock center 16 is pressed against the workpiece W, the thrust of the tailstock center 16 can be easily and finely adjusted by manually turning the operating dial 32 in a low thrust range.

(2) An amount per pulse of the command signal Pc output from the encoder 34 can be changed by the first to fourth multiplication factor setting keys 35A to 35D. Therefore, during the period until the tailstock center 16 contacts the workpiece W, the feed rate of the tailstock 15 can be easily adjusted to a proper feed rate. Also, the value of the thrust can be finely adjusted. Accordingly, the operator can select a feed rate suitable for the operation, and quickly adjust the thrust to an appropriate value. This improves the efficiency of the operation and facilitates the operation.

(3) After the tailstock center 16 engages with the workpiece W, the operator manually turns the operating dial 32 while visually observing the actual thrust value displayed on the thrust displaying portion 24. Accordingly, a tailstock pressure of a low thrust, which is suitable for a workpiece W having a low strength, can be obtained. Therefore, a workpiece W of a low strength can be machined with high precision.

(4) Even if a workpiece W is receiving a low thrust from a tailstock, the CPU 42 displays an alarm on the alarm display portion 37 and does not disable pulses generated by manual turning of the operating dial 32 if the value of the thrust is outside the permissible range. Therefore, the operator can perform tailstock operation with a proper low thrust by manipulating the operating dial 32 again.

The above embodiment may be modified as follows.

In the above embodiment, the function menu key group 26 is formed of a touch panel. However, the function menu key group 26 may be mechanical keys. In this case, it is preferable to display whether each key has been manipulated.

The actual thrust applied to the workpiece W by the tailstock center 16 may be detected by a pressure sensor. In this case, the pressure sensor is located between the tailstock 15 and the tailstock center 16 attached to the tailstock 15.

DESCRIPTION OF THE REFERENCE NUMERALS

K . . . Lead Screw Mechanism, W . . . Workpiece, ΔP . . . Error, Fx . . . Thrust, Pc . . . Command Signal, Pf . . . Feedback Signal, 15 . . . Tailstock, 16 . . . Tailstock Center, 17 . . . Servomotor, 20, 34 . . . Encoders, 28 . . . Low-thrust pressing Key, 31 . . . Manual Pulse Generator

The invention claimed is:

1. A tailstock device comprising a tailstock that is reciprocated by a servomotor via a lead screw mechanism, and a tailstock center attached to the tailstock, the tailstock device supporting a workpiece by pressing the tailstock center against the workpiece, the tailstock device comprising:
a normal tailstock thrust setting means for setting, as a torque limit value of the servomotor, a tailstock thrust required for supporting the workpiece;
a low tailstock thrust setting means for applying a tailstock thrust lower than the normal tailstock thrust to the tailstock center through manual operation, the low tailstock thrust setting means operating to press a distal end of the tailstock center against the workpiece;

a display means for displaying the tailstock thrust of the tailstock center applied to the workpiece; and a disabling means, wherein, when the actual thrust of the tailstock center exceeds a maximum thrust value in a state where a screen of the display means has been switched to a low thrust mode, the disabling means disables the manual operation, wherein, when the actual thrust of the tailstock center is less than or equal to the maximum thrust value and outside a permissible range, the disabling means does not disables the manual operation, and wherein, when the actual thrust of the tailstock center is less than the maximum thrust value and within the permissible range, the disabling means disables the manual operation.

2. The tailstock device according to claim 1, wherein the low tailstock thrust setting means includes:

a low tailstock thrust key for setting the screen of the display means to a low thrust mode; and a manual pulse generator that is manually operated to generate pulses for driving the servomotor, wherein, in a state where the tailstock and the tailstock center are stopped with the tailstock center pressed against the workpiece so that rotational torque of the servomotor is prevented from being influenced by sliding resistance of the tailstock, the servomotor is rotated based on an error between a feedback signal output from an encoder of the servomotor and a command signal generated by the manual pulse generator, thereby elastically deforming the lead screw mechanism, and the elastic resilience of the lead screw mechanism at that time presses the tailstock center against the workpiece with a low tailstock thrust.

3. The tailstock device according to claim 2, comprising a multiplication factor setting means for changing an amount per pulse of a command signal generated by the manual pulse generator.

* * * * *